United States Patent [19]

Shiomura et al.

[11] 4,126,743

[45] Nov. 21, 1978

[54] METHOD FOR CONTINUOUS TRANSFER OF POLYMER SLURRIES

[75] Inventors: Tetsunosuke Shiomura, Takaishi; Tatuo Ooka, Izumi; Hideo Sadatomo, Tokyo, all of Japan

[73] Assignee: Mitsui Toatsu Chemicals, Incorporated, Tokyo, Japan

[21] Appl. No.: 892,022

[22] Filed: Mar. 31, 1978

[51] Int. Cl.$^2$ .............................. C08F 6/00; C08F 6/24
[52] U.S. Cl. ................................. 528/503; 528/493; 528/494; 528/496; 528/501
[58] Field of Search ................................ 528/503, 501

[56] References Cited

U.S. PATENT DOCUMENTS 3,285,899  11/1966  Houser et al. .................... 528/493
3,428,619  2/1969  Hawkins et al. .................... 528/502

Primary Examiner—Stanford M. Levin

[57] ABSTRACT

A polymer slurry composed of solid polymer particles and a diluent such as an inert hydrocarbon and or an inert halogenated hydrocrbon, kept at a sufficient superatmospheric pressure to maintain the diluent in the liquid state, is continuously introduced into a heating tube divided into a first and a second heating zone, the diameter of the second heating zone being larger than that of the first heating zone. The flow rate of the slurry passing through the first heating zone is controlled by regulating the amount of heat supplied to the first heating zone. Substantially all of the vaporized diluent is then introduced into a separation zone and separated from the solid polymer particles.

14 Claims, 3 Drawing Figures

METHOD FOR CONTINUOUS TRANSFER OF POLYMER SLURRIES

BACKGROUND OF THE INVENTION

This invention relates to improvements in a method for the transfer of polymer slurries and, more particularly, to a method for the continuous transfer of a fluid slurry composed of solid polymer particles and a diluent wherein the polymer slurry kept under pressure is continuously passed at a controlled flow rate through two heating zones to vaporized the diluent therefrom and then is introduced into a separation zone to separate the solid polymer particles from the vaporized diluent.

Prior to this invention, it had been proposed (U.S. Pat. Nos. 3,285,899 and 3,428,619) that a polymer slurry should be transferred through a flash tube adapted to separate the solid polymer particles from the diluent.

More specifically, U.S. Pat. No. 3,285,899 discloses a method for the transfer of a polymer slurry composed of solid polyolefin and a diluent, wherein the pressurized polymer slurry is introduced into a sealed heating zone of lower pressure and gradually increasing cross-sectional areas to vaporize the diluent from the polymer slurry. The resulting dispersion of substantially dried polyolefin particles in the diluent vapor is so treated as to isolate the solid polyolefin. It is evident from the description of the example of U.S. Pat. No. 3,285,899 that the flow rate of the polyolefin slurry introduced into the heating zone is regulated by means of an intermittently-actuated valve installed immediately upstream of the heating zone. However, the polyolefin slurry is intermittently introduced into the heating zone because the aforesaid valve is controlled by the on-off action of a timer. As a result of such intermittent introduction, the pressure and flow rate of the stream leaving the heating zone downstream of the valve tend to pulsate considerably.

U.S. Pat. No. 3,428,619 discloses improvements in a similar method of transfer of a polymer slurry. Also in this method, the polymer slurry is introduced into a heating zone by way of an intermittently actuated valve, the supply of polymer slurry being regulated by varying the period of its opening and closing cycles. Accordingly, the pressure and flow rate of the stream leaving the heating zone downstream of the valve still tend to pulsate heavily with time.

When the transfer of polymer slurries is carried out on an industrial scale, the above-described heavy pulsations of the stream leaving the heating zone bring about the following disadvantages.

Firstly, since the diluent vapor separated from the solid polymer particles is cooled and then compressed for liquefaction, a surge tank of very large size is required in order to minimize the effect of the pulsations and to even the load on the compressor.

Secondly, the intermittently actuated valve for regulating the flow rate of the polymer slurry can easily be damaged because it opens and closes with high frequency and the difference between its upstream and downstream pressures is great. Moreover, while the valve is closed, the deposited solid polymer particles, swollen with the diluent, melt on the inner wall of the heating zone, which thus tends to clog. This tendency increases especially when copolymers of low softening point are handled.

Thirdly, since the polymer slurry is intermittently supplied to the heating zone, the zone is loaded with slurry only for a fraction of the time and, therefore, a large-size apparatus is required.

SUMMARY OF THE INVENTION

It is therefore an object of this invention to provide a method for the continuous transfer of polymer slurries.

It is another object of this invention to provide a method for the non-pulsating transfer of a polymer slurry in which the flow rate of the slurry introduced continuously into a heating zone is controlled indirectly without using any intermittently-actuated installed in the stream of the slurry flow.

It is still another object of this invention to provide a method for the continuous transfer of a polymer slurry easily and with small-size apparatus, and without clogging in the heating zone.

These and other objects, features and advantages of this invention will become apparent from the following brief description of the improvement contributed to the art.

In the method of transfer of a polymer slurry composed of solid polymer particles and at least one diluent selected from the group consisting of inert hydrocarbons and inert halogenated hydrocarbons, the polymer slurry, kept at a sufficient super-atmospheric pressure to maintain the diluent in the liquid state, is passed sequentially through a first elongated heating zone of a relatively small diameter and a second elongated heating zone of a diameter larger than that of said first heating zone. Both first and second heating zones are heated with vapors of a heating medium or with steam so as to vaporize said diluent into a carrier vapor to convey the resulting polymer particles. The mixture of diluent vapor and dried solid polymer particles is passed into a separation zone to separate said solid polymer particles from said diluent. The improvement provided by this invention comprises introducing the polymer slurry continuously into the first heating zone, and controlling the flow rate of the polymer slurry passing through said first heating zone by regulating the amount of heat supplied to the first heating zone by the heating medium or steam.

DETAILED DESCRIPTION OF THE INVENTION

Figure 1:
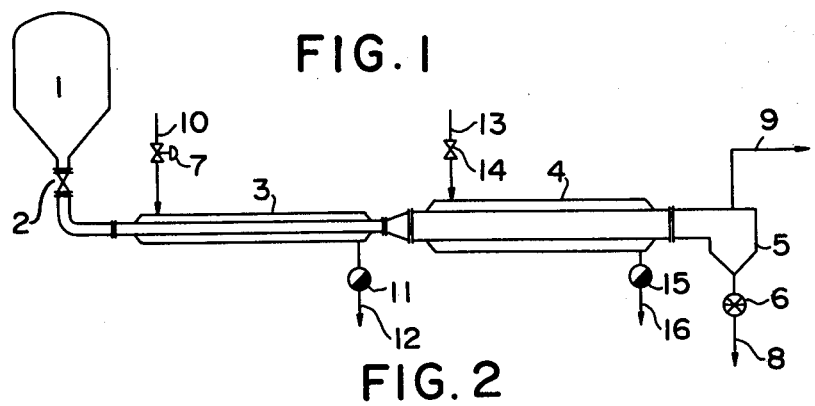
FIG. 1 is a flow diagram of a first embodiment of the invention, illustrating schematically an apparatus suitable for carrying out this embodiment.

Among the solid polymer particles which can be treated by the method of the invention are: a particulate homopolymer or copolymer of mono-1-olefin(s) having from 2 to 8 carbon atoms, such as polyethylene, polypropylene, polybutene and the like; a particulate polyvinyl chloride; and a particulate copolymer of mono-1-olefin(s) and vinyl chloride.

Diluents which can be used to suspend the solid polymer particles may be any inert hydrocarbon or inert halogenated hydrocarbon that remain liquid when kept under pressure and become gaseous at approximately atmospheric pressure and at about 20° C. Examples of such diluents include propane, propylene, butane, butene, vinyl chloride, and methyl chloride.

The polymer slurry, kept in a slurry vessel at a pressure sufficient to maintain the diluent in the liquid state, is then passed into a heating zone, and then introduced into a separation zone which is kept at essentially atmospheric pressure. The heating zone comprises a first elongated heating zone of relatively small diameter and a second elongated heating zone of a diameter larger than that of the first heating zone, both first and second heating zones being heated (preferably) with steam. A discharge valve is installed between the slurry vessel and the first heating zone. This valve is kept fully open throughout the slurry transfer operation. Accordingly the polymer slurry is continuously passed from the slurry vessel into the first heating zone.

Generally, industrial production based on continuous processes involves variations in output (due to load fluctuations). It is desirable, therefore, that each process step is continuously carried out at any load factor of between 50% and 100%.

The goal of this invention is focused on the way in which the flow rate of the polymer slurry is passed from the slurry vessel into the first heating zone. In case of fluid flow, flow control valves of the type which can be continuously throttled to cause a pressure drop necessary for flow rate regulation have been used widely. In case of a slurry, however, since protruded parts in the flow path tend to cause clogging due to the thick deposition of solid particles, no throttling can be applied to ensure a substantial pressure drop. This invention employs a novel control method which, instead of using a flow control valve, is based on the following fundamental findings:

(1) The ratio of vapor to liquid at different points in the flow path of a polymer slurry can be controlled by modifying the heating conditions along the flow path; (2) If the mass velocity is fixed, the pressure loss across a length of section varies widely according to the ratio of vapor to liquid; (3) Accordingly, the flow rate of the polymer slurry passing through a section across which a given pressure difference exists can be controlled by modifying the heating conditions and hence the vaporization rate of the diluent along the flow path; and (4) Heat transfer from condensation of vapor such as steam, exhibiting a high heat transfer coefficient, should be used in order to transfer heat to a fluid flowing at high velocity.

In the method of the invention, the aforesaid fundamental findings are employed as described here below. The polymer slurry introduced into the first heating zone is heated with steam to vaporize the diluent. The ratio of vaporized diluent to the remaining liquid in the first heating zone is controlled by regulating the amount of heat supplied to the polymer slurry. The amount of heat supplied to the polymer slurry is regulated either (1) by varying the temperature of the heating medium or steam in the first heating zone, (2) by varying the flow rate of the heating medium or steam in the first heating zone, or (3) by dividing the first heating zone into at least two separate heating subzones of identical diameter and supplying a desired number of separate heating subzones with the heating medium or steam to vary the heat transfer surface area. The ratio of vapor to liquid in the first heating zone changes in proportion to the amount of heat supplied to the polymer slurry. At a fixed mass velocity, vapor shows a much greater pressure loss than liquid, so that the pressure drop between the inlet and outlet of the first heating zone varies widely according to the amount of heat supplied to the polymer slurry. As a result, the flow rate of polymer slurry passing through the first heating zone also varies. The flow rate of polymer slurry can be increased or decreased by decreasing or increasing the amount of heat supplied to the first heating zone, respectively.

The stream leaving the first heating zone is then introduced into a second heating zone. In the second heating zone, the remaining liquid diluent is vaporized and the diluent is maintained in the vapor phase. Accordingly, the second heating zone is always heated with steam.

While the polymer slurry is passing through the first and second heating zones, substantially all of the liquid diluent in the polymer slurry is vaporized. The resulting high-velocity stream of diluent vapor maintains the solid polymer particles in a uniformly suspended state and carries them into the separation zone, where the dried solid polymer substantially free of diluent is separated from the diluent vapor.

The heating zones used in the method of the invention preferably comprise steam jacketed pipes. The ratio of the diameter of the first heating zone to that of the second heating zone is suitably in the range of from 1:1.2 to 1:3. If both heating zones have an identical diameter, the flow rate of polymer slurry may fail to be controlled satisfactorily. Preferably, the diameter of the first heating zone is not less than about 0.6 cm. In consideration of the amount of polymer slurry to be treated and other conditions, those skilled in the art will be able to properly determine its optimum diameter without any difficulty.

In order to maintain the separated solid polymer particles in a well-dried condition, the length of each heating zone is desirably determined so as to be approximately proportional to its diameter. For either of the first and second heating zones, the ratio of diameter to length is preferably in the range of from 1:400 to 1:6,000. If the ratio is too high, the flow rate of polymer slurry may fail to be controlled satisfactorily, while if it is too low, the separated solid polymer particles may not be properly dried.

Preferably, the flow velocity of polymer slurry at the inlet of the first heating zone is in the range of from 3 to 20 m/sec, and the flow velocity of polymer/diluent mixture at the outlet of the second heating zone is in the range of from 14 to 150 m/sec.

Preferably, the pressure in the slurry vessel is in the range of from 10 to 30kg/cm$^3$ G, the pressure at the inlet of the first heating zone is in the range of from 10 to 30kg/cm$^2$ G, the pressure at the outlet of the first heating zone is in the range of from 5 to 27kg/cm$^2$ G, and the pressure at the outlet of the second heating zone is in the range of from 0.1 to 7 kg/cm$^2$ G. The pressure in the separation zone is also in the range of from 0.1 to 7kg/cm$^2$ G.

The vapor-to-liquid ratio of diluent at the inlet of the first heating zone may vary from 0%, but is preferably in the range of from 0 to 20%. The vapor-to-liquid ratio of diluent at the outlet of the first heating zone may increase to as much as about 80%. The operating conditions of both heating zones should be controlled so that the vapor-to-liquid ratio of diluent at the outlet of the second heating zone will be substantially 100%.

It is desirable that the temperatures of the first and second heating zones do not exceed the softening point of the solid polymer particles in the polymer slurry by more than 50° C. The lower limit of these temperatures may be determined, according to the type of diluent, so that the separated solid polymer particles will be maintained in a well-dried condition.

The method of the invention can suitably be applied to flash drying processes in which a polymer slurry derived from a process for preparing homopolymers and copolymers as defined above is expanded by reducing the initial super-atmospheric pressure to essentially atmospheric pressure and the diluent is thereby separated from the solid polymer to obtain substantially dried solid polymer particles. During the preparation of the polymer, a catalyst suspending agent such as pentane, hexane, heptane, benzene, toluene or xylene is generally used. In addition, a catalyst decomposing agent such as propylene oxide, acetylacetone, or isopropanol is often used in the catalyst decomposition step following the polymerization step. Accordingly, the diluent used in the method of the invention may contain not more than 20% by weight of the aforesaid catalyst suspending agent and/or catalyst decomposing agent.

PREFERRED EMBODIMENTS OF THE INVENTION

In order that those skilled in the art may better understand the invention, two preferred embodiments thereof are described below with reference to the accompanying drawings.

Referring first to FIG. 1, the polymer slurry which is provided in a slurry vessel 1 kept under pressure is passed by way of a discharge valve 2 (which is kept fully open throughout the slurry transfer operation) sequentially through a first heating zone 3 (comprising a jacketed heating pipe of relatively small diameter) and a second heating zone 4 (comprising a jacketed heating pipe of relatively large diameter), and then is introduced into a separation zone (cyclone) 5. Thereafter, the separated solid polymer particles are withdrawn through a rotary valve 6 into a removal line 8. On the other hand, the diluent vaporized in first and second heating zones 3 and 4 is removed directed through an effluent line 9 to a separate recovery process.

As illustrated in FIG. 1, the first heating zone 3 is equipped (preferably) with a steam supply line 10 which serves to introduce steam into its heating jacket and has a steam flow regulating valve 7, and with a steam trap 11 for separating the steam condensate produced in its jacket and a steam condensate discharge line 12 connected thereto. Similarly, the second heating zone 4 is equipped with a steam supply line 13 which serves to introduce steam into its heating jacket and has a steam inlet valve 14, and with a steam trap 15 for separating the steam condensate produced in its jacket and a steam condensate discharge line 16. The steam inlet valve 14 installed in steam supply line 13 is kept open throughout the slurry transfer operation and is not manipulated even if it is desired to vary the flow rate of the polymer slurry.

In contrast, the steam flow regulating valve 7 is manipulated in response to the desired flow rate of polymer slurry. That is, the flow rate of steam supplied to the first heating zone 3 is regulated until the flow rate of polymer slurry is adjusted to the predetermined level.

Figure 2:
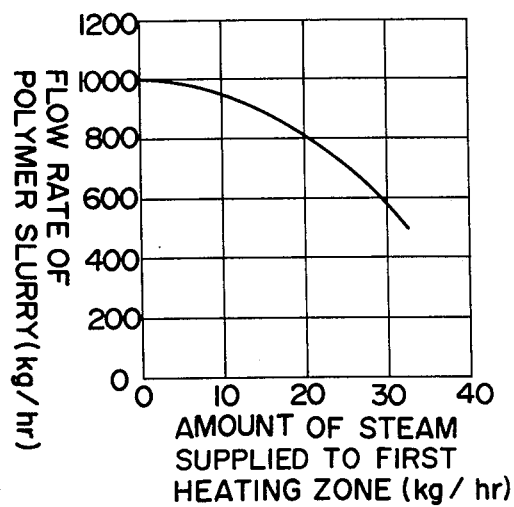
FIG. 2 is a graph showing the relationship between the amount of heat supplied to the polymer slurry in the first heating zone and the flow rate of polymer slurry when using the apparatus of FIG. 1.

FIG. 2 shows the relationship between the amount of steam supplied to the jacket of the first heating zone 3 and the flow rate of polymer slurry passing through the first heating zone 3, on the basis of data obtained from a series of runs which will hereafter be described in Example 1. The data reveal that the flow rate of polymer slurry observed when steam flow rate regulating valve 7 is fully open is reduced to about 50% of that achieved when no steam is supplied to the jacket of the first heating zone 3.

Figure 3:
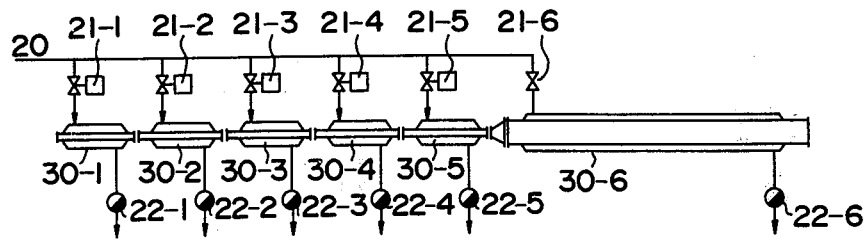
FIG. 3 is a partial flow diagram of a second embodiment of the invention, illustrating a first heating zone divided into a plurality of separate heating subzones as well as a second heating zone.

FIG. 3 illustrates a second embodiment of the invention in which, instead of using steam flow regulating valve 7 to directly regulate the flow rate of steam supplied to the jacket of the first heating zone 3, the first heating zone is divided into a plurality of separate heating subzones having a relatively small diameter and the amount of diluent vaporized in the first heating zone is controlled by varying the heat transfer surface area. More specifically, the apparatus of FIG. 3 is similar to that of FIG. 1 except that the first heating zone 3 is replaced by five separate heating subzones 30-1 to 30-5 of identical size. In these separate heating subzones 30-1 to 30-5, steam is supplied form a main steam supply line 20 through steam flow regulating solenoid valves 21-1 to 21-5 to their respective jackets and steam condensate is discharged from steam traps 22-1 to 22-5. In the second heating zone 30-6, steam is supplied through a steam inlet valve 21-6 to its jacket, the steam inlet valve 21-6 being kept at a predetermined degree of opening throughout the slurry transfer operation, and steam condensate is discharged from a steam trap 22-6. If a maximum flow rate of polymer slurry passing through the subdivided first heating zone is desired, all of the solenoid valves 21-1 to 21-5 are to be closed. As the desired flow rate of polymer slurry decreases, solenoid valves 21-1 to 21-5 are sequentially opened. When all of them are opened, the flow rate of steam supplied to the first heating zone is maximized and, therefore, the flow rate of polymer slurry passing through the first heating zone is minimized. Thus, the flow rate of polymer slurry is controlled stepwise by varying the heat transfer surface area of the first heating zone. The greater the number of the separate heating subzones is, the more delicately the flow rate of polymer slurry can be controlled.

As described above, the method of the invention makes it possible to control the flow rate of a polymer slurry over a wide range. Therefore, when the amount of polymer slurry to be treated has changed for good operational reasons, the amount of heat supplied to the polymer slurry may be correspondingly controlled during the slurry transfer operation. Thus, the method of the invention enables one to continuously transfer a polymer slurry from the slurry vessel through a first and a second heating zone to a separation zone and continuously collect substantially dried solid polymer particles and diluent vapor from the separation zone.

Moreover, as a result of the continuous (i.e. not intermittent) transfer of polymer slurry, the method of the invention requires only a small-size apparatus on account of the high operating efficiency of the heating zones and thereby achieves greater economy than conventional methods involving intermittent transfer of the polymer slurry. Furthermore, as contrasted with conventional methods using an intermittently actuated valve, diluent vapor is continuously fed to a recovery process, whereby the recovery process can be operated without disturbance in the flow and the surge tank for absorbing pulsating flows can be reduced in size.

To further illustrate this invention and not by way of limitation, the following examples are given.

EXAMPLE 1

This example is described with reference to FIG. 1.

(a) Preparation of the slurry

A catalyst suspension composed of 0.15 kg/hr of titanium trichloride, 0.3 kg/hr of diethylaluminum chloride, and 19 kg/hr of heptane was added to 869 kg/hr of propylene (containing 6% by weight of propane), which was thereby polymerized to produce 522 kg/hr of polypropylene. To the resulting polymer slurry, 6 kg/hr of isopropanol and 6 kg/hr of propylene oxide were added so as to decompose the catalysts. The polymerization and catalyst decomposition steps were carried out at a temperature of 60° C. and a pressure of 24 kg/cm² G.

(b) Process of the invention

The resulting polypropylene slurry (containing 58% by weight of solid polypropylene particles) was continuously passed from slurry vessel 1 through a fully opened discharge valve 2 first into a heating zone 3 comprising jacketed pipe of about 0.9 cm inner diameter and 30 m in length and the N into a second heating zone 4 comprising a jacketed pipe of about 1.9 cm inner diameter and 40 m in length, the jacket of each heating zone being independently supplied with steam having a pressure of 2 kg/cm² G and a temperature of 135° C., and finally into a separation zone 5, which included a cyclone, and had its outlet kept at a pressure of 0.4 kg/cm² G. Dried polypropylene powder was separated from the accompanying propylene vapor carrier and then removed through a rotary valve 6, while the propylene vapor was continuously exhausted through an effluent line 9 to a separate recovery process.

Throughout the above-described operation, the steam inlet valve 14 present in the steam supply line leading to the jacket of second heating zone 4 was kept fully open. On the other hand, the flow rate of steam supplied to the jacket of first heating zone 3 was regulated by varying the degree of opening of a steam flow regulating valve 7. The flow rates of polypropylene slurry observed in a series of runs are shown in FIG. 2.

In this example, the flow rate of polypropylene slurry could be controlled over a range of from 500 to 1,000 kg/hr. The residual volatile content of polypropylene powder collected from withdrawal line 8 was 0.15% by weight.

Control 1

A polypropylene slurry similar to that of Example 1 was passed through a ¾-inch V-port valve (nominal) into a heating zone kept at a pressure of 0.4 kg/cm² G at the downstream end. The heating zone comprised a double tube 1.9 cm (¾ inch) in inner diameter and 40 m in length. This tube was heated by supplying its jacket with steam having a pressure of 2 kg/cm² G and a temperature of 135° C. The relationship between the degree of opening of the V-port valve and the flow rate of polypropylene slurry is shown in Table I.

Table 1

| Degree of Opening of V-port Valve (%) | Flow Rate of Polypropylene Slurry (kg/minute) |
|---|---|
| 100 | 19.5 |
| 50 | 19.5 |
| 20 | 18.0 |

From the data shown in Table I it is noted that the flow rate of polypropylene slurry remained almost unchanged when the degree of opening of the V-port valve was varied.

Table II shows the results of a series of runs in which several orifices of difference diameter were inserted in place of the V-port valve. As it is evident from the date shown in Table II, the flow rate exhibited only a very slight decrease even when an orifice of 7 mm diameter was inserted. A run using an orifice of 5 mm diameter had to be discontinued because the orifice was blocked with polymer particle immediately after starting the run.

Table II

| Diameter of Orifice (mm) | Flow Rate of Polypropylene Slurry (kg/minute) |
|---|---|
| none | 19.5 |
| 10 | 19.3 |
| 7 | 17.3 |

EXAMPLE 2

This example is described with reference to FIG. 3. A polypropylene slurry containing 45% by weight of polypropylene particles in propylene was provided in a slurry vessel 1 kept at a temperature of 40° C. and a pressure of 14 kg/cm² G. The polypropylene slurry was continuously passed from the slurry vessel 1 through a fully open outlet valve 2 into a first heating zone divided into five separate subzones 30-1 to 30-5. Thereafter, it was passed through a second heating zone 30-6 and then introduced into a separation zone 5 comprising a cyclone kept at a pressure of 0.3 kg/cm² G.

Each of the separate heating subzones 30-1 to 30-5 comprised a jacketed tube of about 2.5 cm inner diameter and 16 m in length, and the second heating zone 30-6 comprised a jacketed tube of about 3.75 cm inner diameter and 60 m in length. Steam having a pressure of 1.4 kg/cm² G was supplied from a main steam supply line 20 and distributed to the separate subzones 30-1 to 30-5 and to the second heating zone with the aid of hand-operated valves 21-1 to 21-5 and an on-off valve 21-6.

The on-off valve 21-6 was kept fully open throughout each run. In contrast, the hand-operated valves 21-1 to 21-5 associated with the respective separate heating subzones were either fully opened or fully closed. Table III shows the relationship between the number of separate heating subzones supplied with steam and the flow rate of polypropylene slurry.

The dried polypropylene powder was withdrawn through a rotary valve 6 and the diluent vapor was continuously removed overhead through an effluent line 9 and sent to a recovery process.

Table III

| Number of Separate Heating Subzones Supplied with Steam | Flow Rate of Polypropylene Slurry (tons/hours) | Temperature of Collected Polypropylene (C°) | Volatile Content of Collected Polypropylene (% by weight) |
|---|---|---|---|
| 5 | 4.9 | 120 | 0.05 |
| 3 | 7.5 | 110 | 0.10 |

Table III-continued

| Number of Separate Heating Subzones Supplied with Steam | Flow Rate of Polypropylene Slurry (tons/hours) | Temperature of Collected Polypropylene (C°) | Volatile Content of Collected Polypropylene (% by weight) |
|---|---|---|---|
| 0 | 10.3 | 95 | 0.18 |

In all runs, the volatile content of polypropylene powder collected from withdrawal line 8 was not higher than 0.2% by weight, suggesting that the powder was in a well-dried state.

Control 2

A polypropylene slurry similar to that of Example 1 was introduced into a heating zone kept at a pressure of 0.3 kg/cm² G at the downstream end. The heating zone comprised 10 series-connected jacketed tube about 1.9 cm in inner diameter and 4 m in length. Steam having a pressure of 2 kg/cm² G and a temperature of 135° C. was supplied through hand-operated valves to the jackets of the tubes. The hand-operated valves were so manipulated as to supply only a desired number of tubes with steam. Table IV shows the relationship between the number of tubes supplied with steam and the flow rate of polypropylene slurry.

Table IV

| Number of Tubes Supplied with Steam | Flow Rate of Polypropylene Slurry (kg/minute) | Temperature of Collected Polypropylene (° C) |
|---|---|---|
| 10 | 19.5 | 125 |
| 8 | 19.9 | 118 |
| 6 | 21.5 | 95 |
| 4 | 26.0 | 60 |

As the number of tubes supplied with steam decreased, the flow rate of polypropylene slurry increased but the temperature of the collected polypropylene decreased. When only four pipes were supplied with steam, the volatile content of collected polypropylene was as high as 3.0% by weight.

EXAMPLE 3

A polyethylene slurry containing 40% by weight of polyethylene particles in isobutane was provided in a slurry vessel kept at a temperature of 80° C. and a pressure of 16kg/cm² G. Using the apparatus of Example 1, the polyethylene slurry was continuously fed in the same manner as described in Example 1. It was observed that when steam was not supplied to the heating jacket of first heating zone 3 with valve 7 fully closed, the flow rate of the polyethylene slurry was 1,200 kg/hr, while when 4.0kg/hr of steam was supplied with valve 7 fully open, the flow rate of the polyethylene slurry was 500 kg/hr and when the valve 7 was half open, the flow rate of the polyethylene slurry exhibited an intermediate value.

On the other hand, steam inlet valve 14 was kept fully open throughout each run, so that steam was always supplied to the heating jacket of second heating zone 4.

In all runs, the temperature of the polyethylene collected from line 8 was in the range of from 80° to 120° C. and the volatile content was in the range of from 0.1 to 0.4% by weight. No blockage of the heating zones was observed.

What is claimed is:

1. In the method for the transfer of a polymer slurry composed of solid polymer particles and at least one diluent selected from the group consisting of inert hydrocarbons and inert halogenated hydrocarbons including providing said polymer slurry in a slurry vessel kept at a super-atmospheric pressure sufficient to maintain said diluent in the liquid state, passing said polymer slurry sequentially through a first elongated and jacketed heating zone of relatively small diameter and a second elongated and jacketed heating zone having a diameter larger than that of said first heating zone, said first and second heating zones being both heated with heating means selected from the group consisting of vapor of a heating medium and steam so as to vaporize said diluent for conveyance of the solid dried polymer particles, and introducing the mixture of said vaporized diluent and said solid dried polymer particles into a separation zone to separate said solid polymer particles from the diluent vapor, the improvement which comprises introducing said polymer slurry continuously from said slurry vessel into said first heating zone and controlling the flow rate of said polymer slurry passing through said first heating zone by regulating the amount of heat supplied to said first heating zone through said heating means.

2. The method as claimed in claim 1 wherein the temperatures of said first and second heating zones do not exceed the softening point of said solid polymer by more than 50° C.

3. The method as claimed in claim 1 wherein the amount of heat supplied to said first heating zone is regulated by varying the temperature of said heating means.

4. The method as claimed in claim 1 wherein the amount of heat supplied to said first heating zone is regulated by varying the flow rate of said heating means.

5. The method as claimed in claim 1 wherein the amount of heat supplied to said first heating zone is regulated by dividing said first heating zone into at least two separate heating subzones having the same diameter and heating only a desired number of said separate heating subzones.

6. The method as claimed in claim 1 wherein the ratio of the inner diameter of said first heating zone to that of said second heating zone is in the range of from 1:1.2 to 1:3.0.

7. The method as claimed in claim 1 wherein the lengths of said first and second heating zones are from 400 to 6,000 times as great as the diameters of the respective heating zones.

8. The method as claimed in claim 1 wherein said polymer slurry comprises a product obtained from polymerizing at least one monomer selected form the group consisting of mono-1-olefins having from 2 to 8 carbon atoms and vinyl chloride.

9. The method as claimed in claim 1 wherein said diluent is at least one compound selected from the group consisting of propane, propylene, butane, butene, vinyl chloride, and methyl chloride.

10. The method as claimed in claim 1 wherein said diluent contains not more than 20% by weight of at least one member selected from the group consisting of a polymerization catalyst-suspending agent and a polymerization catalyst-decomposing agent derived from the preparation of said solid polymer slurry particles.

11. The method as claimed in claim 1 wherein the flow velocity of said polymer slurry at the inlet of said first heating zone is in the range of from 3 to 20 meters per second and the flow velocity of the mixture of said solid polymer and said vaporized diluent at the outlet of said second heating zone is in the range of from 14 to 150 meters per second.

12. The method as claimed in claim 1 wherein the pressures at the inlet and the outlet of said first heating zone are in the range of from 10 to 30 kg/cm$^2$ G and in the range of from 5 to 27 kg/cm$^2$ G, respectively, and the pressure at the outlet of said second heating zone is in the range of 0.1 to 7 kg/cm$^2$ G.

13. The method as claimed in claim 1 wherein said polymer slurry is composed of polyethylene and isobutane.

14. The method as claimed in claim 1 wherein said polymer slurry is composed of polypropylene and propylene.

* * * * *